United States Patent
Mittal

(10) Patent No.: US 12,148,006 B1
(45) Date of Patent: Nov. 19, 2024

(54) INTERACTIVE ADVERTISEMENT SYSTEM AND METHOD

(71) Applicant: Ravi Kant Mittal, London (GB)

(72) Inventor: Ravi Kant Mittal, London (GB)

(*) Notice: Subject to any disclaimer, the term of this patent is extended or adjusted under 35 U.S.C. 154(b) by 0 days.

(21) Appl. No.: 18/225,444

(22) Filed: Jul. 24, 2023

(51) Int. Cl.
| | |
|---|---|
| *G06Q 30/02* | (2023.01) |
| *G06Q 30/0203* | (2023.01) |
| *G06Q 30/0204* | (2023.01) |
| *G06Q 30/0242* | (2023.01) |
| *G06Q 30/0251* | (2023.01) |

(52) U.S. Cl.
CPC ..... *G06Q 30/0271* (2013.01); *G06Q 30/0203* (2013.01); *G06Q 30/0204* (2013.01); *G06Q 30/0245* (2013.01)

(58) Field of Classification Search
CPC .......... G06Q 30/0271; G06Q 30/0203; G06Q 30/0204; G06Q 30/0245
See application file for complete search history.

(56) References Cited

U.S. PATENT DOCUMENTS

| | | | |
|---|---|---|---|
| 7,337,127 B1 | 2/2008 | Smith | |
| 9,213,769 B2* | 12/2015 | Stekkelpak | G06F 16/9535 |
| 9,569,979 B2 | 2/2017 | Manabu | |
| 2006/0218036 A1* | 9/2006 | King | G06Q 30/0203 |
| | | | 705/14.55 |
| 2013/0339333 A1* | 12/2013 | Stekkelpak | G06Q 30/0256 |
| | | | 707/706 |
| 2020/0184510 A1 | 6/2020 | Stephen | |
| 2023/0101487 A1 | 3/2023 | Briancon | |

FOREIGN PATENT DOCUMENTS

| | | |
|---|---|---|
| KR | 20010081480 A | 8/2001 |
| KR | 20070097754 A | 10/2007 |
| KR | 20090125884 A | 12/2009 |

OTHER PUBLICATIONS

*Trinity Info Media, LLC* v *Covalent, Inc* (CAFC Jul. 14, 2023)(precedential) (Year: 2023).*
Stephanie N. Berberick, Online Quizzes as Viral, Consumption-Based Identities, 2016.
O'Brien, Kaitlin, Introducing Vuukle's Latest Engagement Widget: Boost Audience Interaction with Customizable Quizzes Powered by AI Automation; May 30, 2023; Website: https://blog.vuukle.com/introducing-vuukles-latest-engagement-widget-boost-audience-interaction-with-customizable-quizzes-powered-by-ai-automation/.

* cited by examiner

*Primary Examiner* — Breffni Baggot
(74) *Attorney, Agent, or Firm* — Seyfarth Shaw LLP

(57) ABSTRACT

The present invention relates to methods, devices, and systems for interactive online advertising that maximize user engagement by incorporating interactive quizzes. The method dynamically generates quizzes based on the user's current content engagement, presenting questions relevant to the content to enhance user interest and engagement. Additionally, sponsored questions are strategically inserted into the quiz, seamlessly blending with the user experience to foster deeper interaction with the advertisement. This approach optimizes user engagement with the advertisement, promoting effective and targeted content delivery while creating an engaging and interactive advertising experience.

10 Claims, 9 Drawing Sheets

INTERACTIVE ADVERTISEMENT SYSTEM AND METHOD

TECHNICAL FIELD OF THE INVENTION

The present invention relates to the field of online advertising and marketing platforms. More specifically, it relates to a system and method for Interactive Advertising and Content-Based Engagement. The invention pertains to a quiz generation system that seamlessly integrates sponsored questions within content-based quizzes to enhance user engagement and deliver relevant advertising content.

BACKGROUND

In the ever-evolving landscape of digital advertising, marketers and content providers are continuously seeking innovative methods to engage users effectively while delivering sponsored content that resonates with their target audience. Traditional advertising formats, such as banner ads and pop-ups, often face challenges in capturing users' attention and generating meaningful interactions. As a result, the need for more interactive and user-friendly advertising approaches has become evident.

Content-based advertising has emerged as a promising solution to address these challenges. Rather than interrupting users' online experience with intrusive ads, content-based advertising aims to provide valuable and engaging content that aligns with users' interests and preferences. By offering content that users find relevant and useful, advertisers can build stronger connections with their audience and foster positive brand associations.

In this context, interactive quizzes have gained popularity as a compelling form of content that captivates users and encourages active participation. Quizzes offer users an opportunity to test their knowledge, learn new information, and have fun while engaging with the platform. Users are drawn to quizzes that challenge them and provide personalized feedback based on their responses.

U.S. Pat. No. 9,569,979, owned by Masaoka Manabu, presents a system for interactive language learning advertisements. The system incorporates a method of evaluating user responses to quizzes related to lesson content, providing service providers with a means to monitor user engagement.

U.S. patent application 2023101487A1 by Cerebri AI Inc. provides a "Customer Journey Management Engine" that employs machine learning models to create sequences of questions that guide customer journeys.

U.S. Pat. No. 7,337,127B1 by FaceCake Marketing Technologies, Inc., outlines a method for targeting marketing content to online users by analysing user data.

Furthermore, non US patents such as KR20070097754A by Dream Wiz Inc., KR20010081480A by Han Sang Don, and KR20090125884A each discuss unique methods of integrating quizzes into internet advertising strategies. These aim to increase ad effectiveness and user engagement.

US20200184510A1 describes a system that leverages machine learning to predict the likelihood of individuals being influenced by specific advertisements.

Non-patent literature, such as the article "Online Quizzes as Viral, Consumption-Based Identities," discusses the role of online quizzes in constructing virtual identities and monetizing digital content, exemplifying BuzzFeed as a prime case.

The existing prior arts disclose interactive advertising, quizzes, and user engagement in various forms, but they have not specifically addressed the novel concept of tailoring quiz questions based on the content that users have consumed. Further, there remains a considerable gap in the market for a user-specific interactive advertising platform that leverages consumed content to formulate questions and seamlessly integrates sponsored quizzes in an engaging manner.

SUMMARY

Recognizing the engagement potential of interactive quizzes, the invention proposes a quiz generation system that seamlessly integrates sponsored questions into content-based quizzes. By incorporating sponsored questions within the quiz format, advertisers can deliver branded content in a more organic and user-friendly manner. Sponsored questions become an integral part of the user's quiz experience, providing valuable insights into users' preferences and interests.

Personalization is another key aspect of the invention. By analyzing users' quiz results, interests, and preferences, the system generates personalized content recommendations. This tailored approach ensures that the content delivered to each user is relevant and engaging, leading to increased user satisfaction, retention, and loyalty.

Another aspect of the invention presents a quiz generation system that combines content-based quizzes with sponsored questions to create an engaging and interactive advertising experience. The system operates through an Advertisement Server and a Content Provider Server, facilitating seamless communication with client devices over a network.

The Content Provider Server serves as a repository of diverse content, including articles, videos, images, and multimedia elements. When users submit queries through their client devices, the Content Provider Server searches its database and retrieves relevant content based on the user's search criteria.

The Advertisement Server analyzes the user's responses to generate personalized content recommendations. By leveraging user quiz results, interests, and preferences, the system tailors content delivery to ensure relevance and engagement. The platform aims to foster a deeper connection with users by offering personalized recommendations, thereby increasing user satisfaction, retention, and loyalty.

The quiz generation system includes several engaging features, such as a dynamic levelling system that monitors users' progress and performance throughout their quiz journey. Users advance through different stages or levels as they successfully complete quizzes and answer questions correctly, encouraging continued participation and exploration.

Additionally, the Advertisement Server implements a point-based reward system to incentivize user engagement and success. Users earn points for each correct answer in quizzes and for completing them successfully. The accumulation of points enables users to compete with others on leaderboards, fostering a sense of achievement and friendly competition.

Furthermore, the system empowers advertisers to deliver targeted and effective advertising campaigns. The Advertisement Server creates specific audience segments based on users' quiz responses, interests, and preferences, allowing advertisers to deliver re-targeted ads to users interested in specific topics or products. Advertisers can also customize the quiz appearance and content presentation to align with their brands or campaigns, enhancing brand visibility and integration.

Through collaboration between advertisers and content providers, the system fosters the creation of quizzes that seamlessly integrate content and sponsored questions. By striking a balance between content-related questions and sponsored questions, the platform delivers engaging quizzes that provide both informative content and relevant sponsored content. Collaborative campaigns benefit both advertisers, who gain exposure to a targeted and engaged audience, and content providers, who receive additional revenue streams from sponsored questions.

DETAILED DESCRIPTION

Provided below is the non-limiting exemplary embodiment of the present disclosure, and a reference will now be made in detail to specific embodiments or features, examples of which are illustrated in accompanying drawings. Wherever possible, corresponding or similar reference numbers will be used throughout the drawings to refer to the same or corresponding parts. Moreover, references of the various elements described herein, are made collectively or individually when there may be more than one element of the same type. However, such references are merely exemplary in nature. It may be noted that any reference to the element in the singular may also be constructed to relate to the plural and vice-versa without limiting the scope of the disclosure to the exact number or type of such element unless set forth explicitly in the appended claim.

In the following detailed description of the invention, numerous details, examples, and embodiments of the invention are set forth and described. However, it will be clear and apparent to one skilled in the art that the invention is not limited to the embodiments set forth and that the invention may be practised without some of the specific details and examples discussed.

Figure 1:
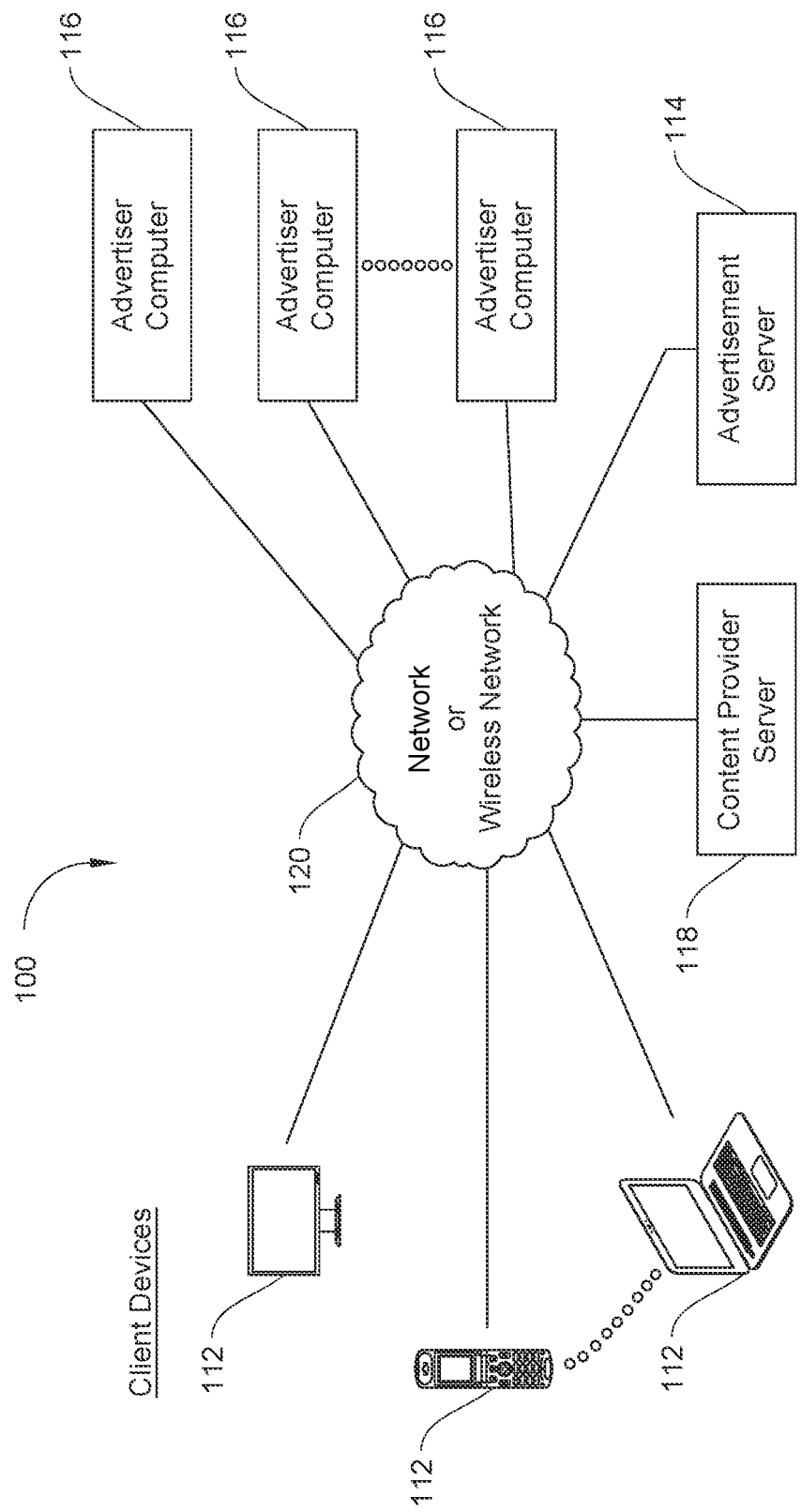
FIG. 1 illustrates an interactive advertisement system.

Referring now to FIG. 1, FIG. 1 shows components of one embodiment of an environment in which the invention may be practiced. Not all the components may be required to practice the invention, and variations in the arrangement and type of the components may be made without departing from the spirit or scope of the invention. As shown in FIG. 1, a system 100 for Interactive Advertising includes a plurality of client devices 112, Advertisement server(s) 114, Advertiser computers 116, content provider server(s) 118, and a network 120.

The client devices 112 comprises the capability of connecting to network 120 using wireless technology, wired technology, or a combination of both wired and wireless technologies. Thus, client device 112 may include virtually any portable computing device capable of connecting to another computing device and receiving information. Such devices include portable devices such as cellular telephones, smart phones, display pagers, radio frequency (RF) devices, infrared (IR) devices, Personal Digital Assistants (PDAs), handheld computers, sensors, laptop computers, wearable computers, tablet computers, smart TVs, integrated devices combining one or more of the preceding devices, and the like.

The client device 112 may further include a browser application 113 that is configured to receive and send web pages, web-based messages, and the like. The browser application 113 may be configured to receive and display graphics, text, video, multimedia, and the like, employing virtually any web based language or protocol, including a wireless application protocol messages (WAP), and the like. In one embodiment, the browser application 113 is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message. Client device 112 may also include one or more other web applications 113 that are configured to receive digital content (such as graphics, text, video, multimedia, and the like) from another computing devices. The web application 113 may include a capability to provide and receive textual content, graphical content, audio content, video content, and the like. The web application may further provide information that identifies itself, including a type, capability, name, and the like. Client device 112 may further be configured to include a web application 113 that enables the end-user to log into an end-user account that may be managed by a network application. Such an end-user account, for example, may be configured to enable the end-user to receive emails, send/receive messages, and access selected web pages, maintain a digital wallet, or the like.

The Advertisements Server 114 provides advertisements, such as quiz advertisements, application advertisements, or other types of advertisements. The Advertisements Server 114 may have an associated database, which may be integrated with or in communication with Content Provider Server 118. The database may store data pertaining to user profiles, advertisement content, quiz questions, user responses, and other critical data that drive the platform's personalized advertising capabilities. An advertiser may specify data describing the advertisement contents, constraints, and rules pertaining to the use of each advertisement. These databases efficiently organize and manage the vast amount of information generated on the platform.

Advertisement Server 114 may receive data or a set of parameters to use for determining whether to provide an advertisement, selecting and generating an advertisement, including data upon which various determinations are made. Selecting and generating an advertisement may include selecting an advertiser, selecting an advertisement associated with the advertiser, or selecting content to include in an advertisement. The data upon which these and other determinations may be based may include information derived from user data, user profile, information related to interactions among users and interfaces and function links, and associated reference nodes or objects received by the Content Provider Server 118, and the like. The data upon which these and other determinations may be based may also include information about the user or mobile device, actions that the user or mobile device have taken, data pertaining to one or more advertisers, relevant events, and a variety of other types of information. The Advertisement Server 114 operates to serve advertisements to client devices 114. An advertisement may include text data, graphic data, image data, video data, or audio data. Advertisements may also include data defining advertisement information that may be of interest to a user of an audience device.

The Advertisement Server 114 disclosed herein utilizes the power of artificial intelligence (AI) to elevate quiz generation for targeted advertising. By leveraging AI algorithms, Advertisement server 114 delivers personalized and contextually relevant quizzes, enhancing user engagement and optimizing advertising effectiveness.

The system 100 further includes a Content Provider Server 118 that offers users with a diverse range of content, such as articles, videos, blogs, games, and interactive features. The content provider server 118 acts as a repository for a wide range of content that can be accessed and retrieved by users upon submitting relevant queries. The user can subscribe to the various service provided by the content provider server 118. The users of client devices 114 may need to log in before accessing any content of the Content Provider Server 118. When a user initiates a search or query on their client device, such as typing keywords into a search box or clicking on specific topics, the Content Provider Server 118 receives and processes these queries. The server's algorithms then determine the most appropriate content related to the user's query, taking into account factors like relevance, popularity, and user preferences.

The Content Provider Server 118 serves as a mediator between advertisers and users, as it communicates with the Advertisement Server 114 to deliver targeted advertising content to users based on their preferences and interactions. Through this seamless communication between the Content Provider Server 118 and Advertisement Server 114, system 100 ensures that users receive advertisements integrated naturally with the content they consume, providing a non-intrusive and engaging advertising experience.

Though FIG. 1 illustrates an embodiment of a system 100 having each of Advertisement server(s) 114 and Content Provider Server(s) 118 as separate computing devices, the invention is not so limited. Software, hardware, or hardware-software combinations implementing any portion of these components may be combined with any other component on a single computing device, or arranged in a different manner among multiple computing devices. Some portion or all of the functionality of any component may be distributed or duplicated among multiple computing devices.

The Advertisement server(s) 114 and Content Provider Server(s) 118 are depicted as separate computing devices for illustrative purposes, but it is important to note that the invention is not limited to this specific configuration. The system's architecture allows for flexibility, and both the Advertisement server(s) 114 and Content Provider Server(s) 118 may be operated together and/or on a single computing device if desired. Additionally, it is not mandatory for both servers to be operated by the same entity. The invention accommodates various deployment scenarios, enabling different entities to operate the Advertisement server(s) 114 and Content Provider Server(s) 118 independently, based on their specific requirements and business models. This adaptable approach ensures that the patent application covers a wide range of implementations and fosters a scalable and customizable advertisement ecosystem.

Advertiser computers 116 serve as the interface for advertisers to manage their advertising campaigns on system 100. Advertisers can access system 100 to submit quiz content, monitor campaign performance, view user engagement metrics, and access valuable data related to user preferences and responses.

Network 120 is configured to couple client devices 114 with other network devices, such as Advertisement server(s) 114, Content Provider Server(s) 118, and Advertiser computers 116. Though for illustrative purposes network and wireless network are shown combined, in various environments employing the present invention, network and wireless network may be the separate or same network, different networks, or different networks including a combination of overlapping components and distinct components. The discussion herein that describes network 130 may therefore be applicable to describe network 120. Network 120 may include any of a variety of wired or wireless sub-networks that may further overlay stand-alone ad-hoc networks, and the like, to provide an infrastructure-oriented connection for mobile device 135. Such sub-networks may include mesh networks, Wireless LAN (WLAN) networks, cellular networks, and the like. Additionally, network 120 may connect to client devices 112 with a wired connection, such as cable, phone lines, Ethernet wires, and the like. Network 120 may include wide area networks, such as the Internet. The invention may be used either generally with networks, specifically with wireless networks, or with various combinations of wireless and wired networks.

Network 120 may further include or employ one or more network gateways (not shown) that serve as intermediaries between client devices 114 and other network devices, such as advertisement server 114. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ different protocols.

FIG. 1 shows client device 114 communicating with Content Provider Server(s) 118, and Content Provider Server(s) 118 communicating with Advertisement Server 114. Each of these communications may employ a direct connection, or one or more networks, or a combination thereof. For illustrative purposes, FIG. 1 shows communication between Advertisement Server(s) 114 and Content Provider Server(s) 118 employing network 120, however environments that include this communication may be employed with the present invention. In particular, Advertisement Server 114 and Content Provider Server(s) 118 may employ any one or more of direct communication, a local area network, or a wide area network, such as network 120.

Though FIG. 1 illustrates an embodiment of a system having each of Advertisement server(s) 114 and Content Provider Server(s) 118 as separate computing devices, the invention is not so limited. Software, hardware, or hardware-software combinations implementing any portion of these components may be combined with any other component on a single computing device, or arranged in a different manner among multiple computing devices. Some portion or all of the functionality of any component may be distributed or duplicated among multiple computing devices.

The Content Provider Server 118 may be accessed by client devices 112 over the network 120. The client device 112 may communicate a user query to the Content Provider Server 118. For example, a query entered into a query entry box can be communicated to the Content Provider Server 118. The Content Provider Server 118 locates matching content using a suitable protocol or algorithm. In addition, the Advertisement Server 114 generate a quiz that is based on the content. The Content Provider Server 118 then returns content to the client device 114 along with the quiz generate by the Advertisement Server 114. The quiz generated by the Advertisement Server 114 include questions related to the content provided to the client device and some sponsored questions provided by the advertisers.

Sponsored questions are a form of advertising content strategically integrated within interactive quizzes or surveys. These questions are specifically designed and curated by advertisers to seamlessly blend with the quiz content while aligning with the overall theme of the quiz. The sponsored questions aim to engage users in a non-disruptive manner and provide them with relevant brand messages, product information, or promotional offers. By incorporating sponsored questions, advertisers can leverage the interactive nature of quizzes to effectively reach their target audience and deliver their marketing messages in an engaging and contextually relevant way. This advertising approach allows brands to create a deeper connection with users, fostering brand awareness and encouraging positive brand associations through a gamified and interactive experience. Sponsored questions are generally provided by the advertisers to the Advertisement Server 114.

Figure 2A:
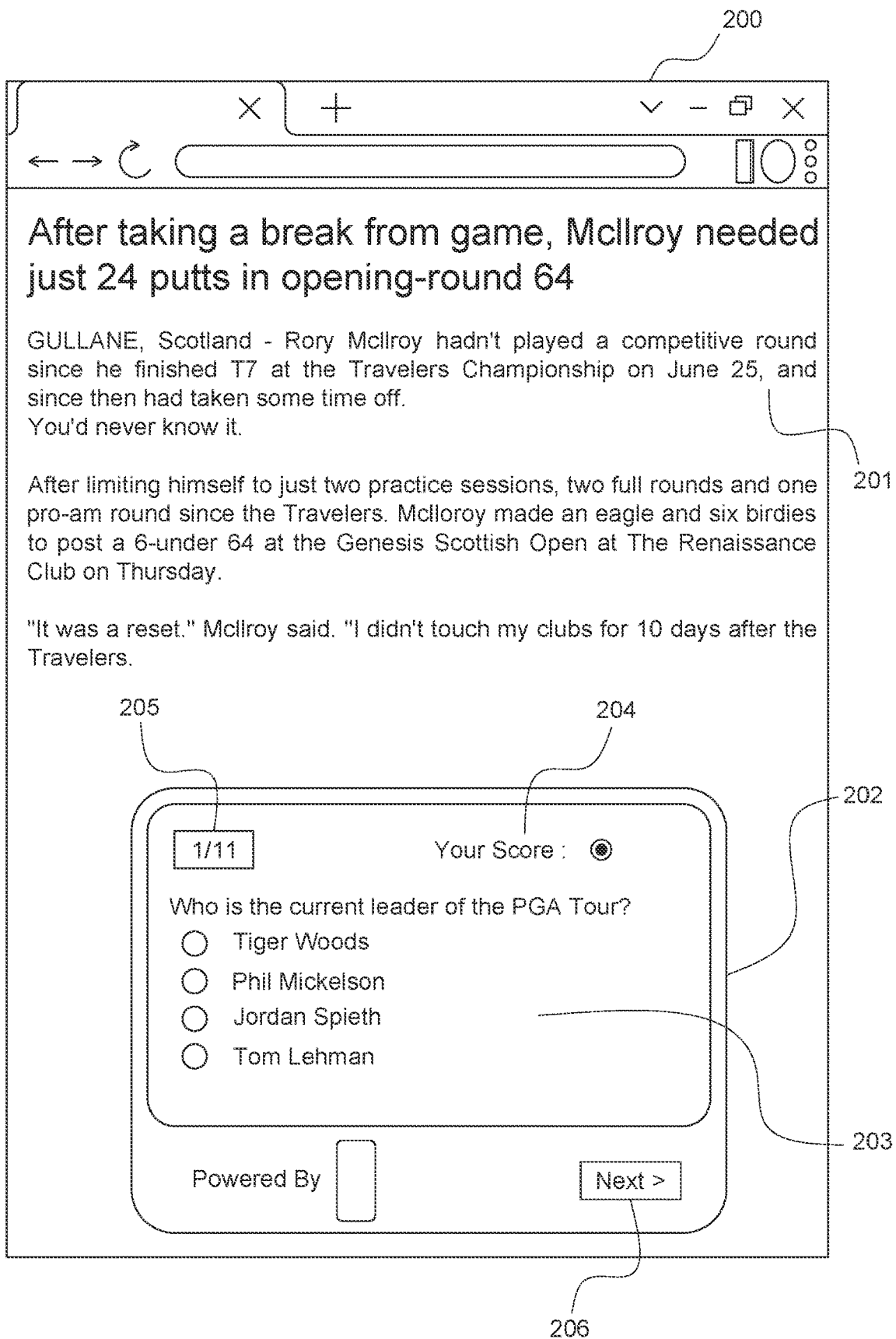
FIG. 2a illustrates a visual representation of a web page that is presented to a user in response to a query for content.
Figure 2B:
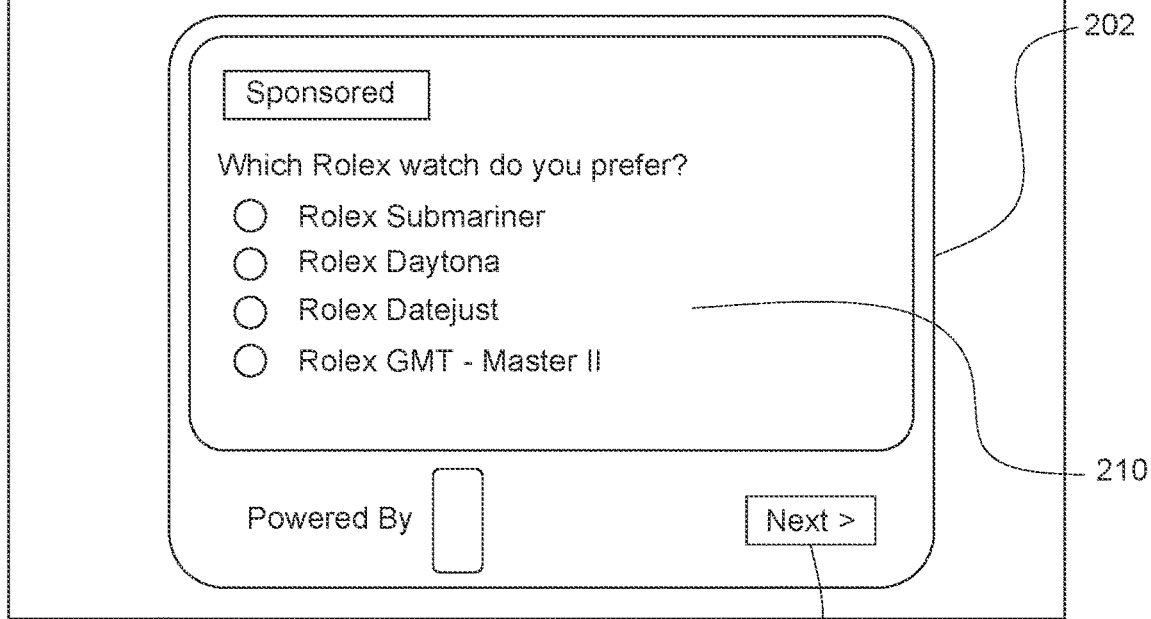
FIG. 2b illustrates a visual representation of a web page that is presented to a user in response to a query for content.

FIG. 2a and FIG. 2b shows a visual representation of a web page 200 presented to a client device 114. FIG. 2a and FIG. 2b illustrates the seamless integration of user-specific content and a related quiz, offering a personalized and engaging experience to the user. In FIG. 2a the web page 200 include content 201 that is requested by the user, and it also incorporates an interactive quiz section 202. The interactive quiz section 202 may appear as pop-ups, embedded within the content, or as standalone elements on a page. The interactive quiz section 202 further include a multiple choice question 203 that is based on the presented content 201, score 204, question number 205, and a Next button 206. After selecting an answer, users can click on the Next button 206 to proceed to the next question. This continues the user's journey through the quiz and maintains their engagement with the content. While the current embodiment is exemplified with a multiple-choice question, the platform accommodates various quiz forms, including multiple-choice selections, text input, rating scales, and more. After a user is engaged with the quiz, sponsored questions can be strategically inserted in the quiz that a user otherwise will not answer.

As seen in FIG. 2b, the interactive quiz section 202 of the web page 200 includes a sponsored question 210 that is loaded when the user answers the first some quiz question 203. By presenting content and quiz questions to the user, the system 100 maximizes user engagement and encourages active participation. Additionally, the introduction of sponsored questions adds an interactive advertising element that aligns with the user's interests and enhances brand engagement.

Figure 2C:
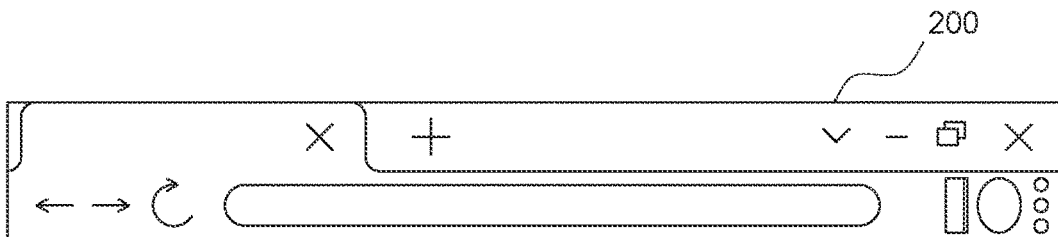
FIG. 2c illustrates a visual representation of a web page that is presented to a user in response to a query for content.

In another embodiment, when the users of the client device 114 actively engage with the presented quiz and answer some of the questions then an advertisement can be inserted along with the interactive quiz section 202. FIG. 2c shows a visual representation of web page 200 in which advertisement 220 is integrated next to the interactive quiz section 202. This will provide an even more direct advertising opportunity for the advertisers 116.

Figure 2D:
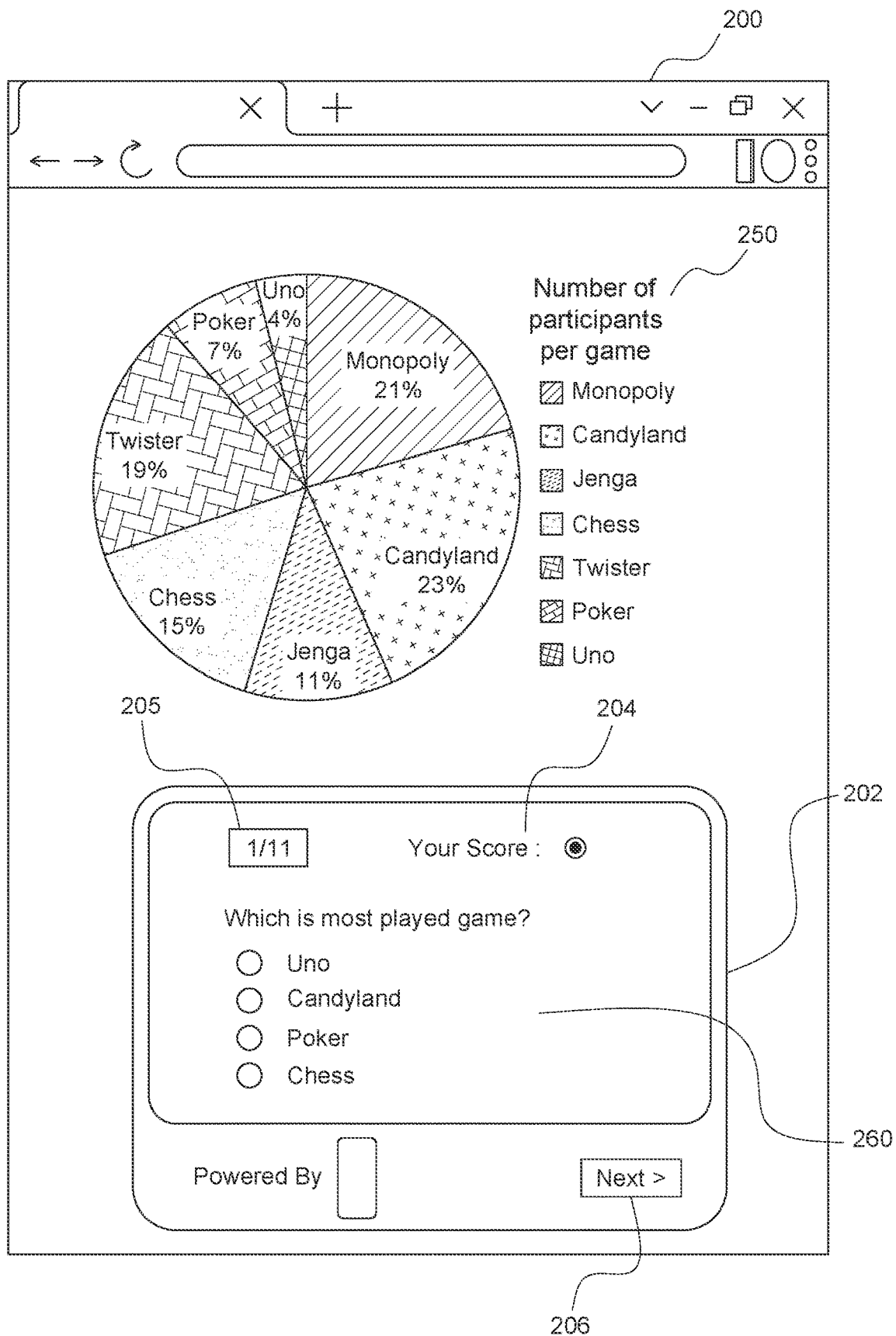
FIG. 2d illustrates a visual representation of a web page that is presented to a user in response to a query for content.

In another embodiment depicted in FIG. 2d represents a web page 200 that presents user with image-based content. In FIG. 2d the web page 200 include image-based content 250 that is requested by the user, and it also incorporates an interactive quiz section 202. The interactive quiz section 202 further includes a multiple choice question 260 that is based on the presented image-based content 250.

When the user interacts with the quiz, the system 100 efficiently collects user responses for each quiz. The responses are securely transmitted to the database of the Advertisement Server 114. The System 100 features a comprehensive data management structure that can handle various quiz formats seamlessly. With data collected from diverse quiz formats, content creators and advertisers gain a comprehensive understanding of user preferences, opinions, and behaviour. Analytical tools and reporting features in the Advertisement Server 114 facilitate the extraction of valuable insights, empowering users to make data-driven decisions to optimize content delivery and advertising strategies.

The system 100 captures user interactions and quiz responses, enabling the creation of specific audience segments based on their interests, preferences, and behaviours. These audience segments are carefully curated, allowing advertisers to re-target users with relevant ads that align with their demonstrated interests. By customizing advertisements to specific audience segments, advertisers can maximize the effectiveness of their campaigns, leading to higher conversion rates and enhanced return on investment.

To reinforce brand recognition and cohesion, the system empowers advertisers to customize the color scheme and font of the interactive quizzes. This customization aligns the quizzes with the advertisers' brand identity, creating a consistent and visually appealing experience for users. A cohesive brand-specific quiz enhances brand recall and establishes a stronger connection between the user and the advertiser's brand.

The advertisement server 114 may include several engaging features, including Progress and Levelling Up, a Point System, and a Badge Awarding System. These elements are designed to enhance user engagement, motivate continued participation, and recognize users' achievements and expertise. The system introduces a dynamic levelling system implemented in the advertisement server that closely monitors users' progress and performance throughout their quiz journey. As users successfully complete quizzes and answer questions correctly, they advance through different stages or levels. This leveling up mechanism provides a sense of achievement and advancement, encouraging users to continue participating and exploring further quizzes. Users may start at a lower level and progress to higher levels by demonstrating their knowledge and competence in various topics. To further incentivize user participation and success, the advertisement server 114 include a point-based reward system. Users earn points for each correct answer and completed quiz. Accumulating points allows users to compete with others on leaderboards, fostering a sense of achievement and healthy competition. The point system adds a gamification element to the platform, motivating users to continuously strive for higher scores and greater success in their quiz endeavors. The advertisement server 114 further includes an intelligent module that awards badges to users based on their proficiency in specific topics. To recognize users' proficiency and expertise in specific topics, the Advertisement Server 114 incorporates an intelligent badge awarding system. Based on users' quiz performance and their accuracy in answering questions related to particular subjects, the system awards them with badges or virtual awards. These badges act as visual symbols of users' accomplishments and knowledge in specific areas, fostering a sense of pride and accomplishment. Users may earn multiple badges in various topics as they progress and showcase their expertise across a wide range of subjects.

Once a user completes the interactive quiz, the Advertisement Server 114 collects and stores the user's responses, including the answers provided to the content-related and sponsored questions within the quiz. The Advertisement Server 114 thoroughly analyzes the user's quiz responses to gain insights into their preferences, interests, and knowledge. The advertisement server 114 takes into account how the user performed in the quiz, including the accuracy of their answers, completion time, and any patterns in their responses. Based on the analysis of the user's quiz results, interests, and preferences, the Advertisement Server 114 generates personalized advertisement recommendations. These recommendations are specifically tailored to each user, ensuring that the advertisement suggested aligns with their individual preferences and areas of interest. By providing personalized recommendations, the system 100 aims to enhance user satisfaction. Users receive advertisement that directly appeals to their interests, making their overall experience more enjoyable and rewarding. This personalized approach fosters a deeper engagement with the content and increases the likelihood of users returning to the platform for more quizzes and relevant content. As users find value in the personalized recommendations and engaging content, they are more likely to stay connected to the system 100 over time. This increased user retention leads to greater user loyalty, building a strong and loyal user base.

The personalized recommendation system benefits advertisers as well. The Advertisement Server 114 can create specific audience segments based on users' quiz responses, interests, and preferences. These segments allow advertisers to deliver targeted and re-targeted ads to users who have shown interest in particular topics or products. The Advertisement Server 114 can also customize the quiz appearance and content presentation to align with specific brands or advertisers. This customization enhances brand visibility and ensures that sponsored content seamlessly integrates with the overall quiz experience. With the insights gained from user responses and personalized recommendations, advertisers can design highly effective and engaging advertising campaigns. By delivering relevant content to interested users, advertisers can increase the likelihood of conversions and achieve their campaign objectives more efficiently.

Figure 3:
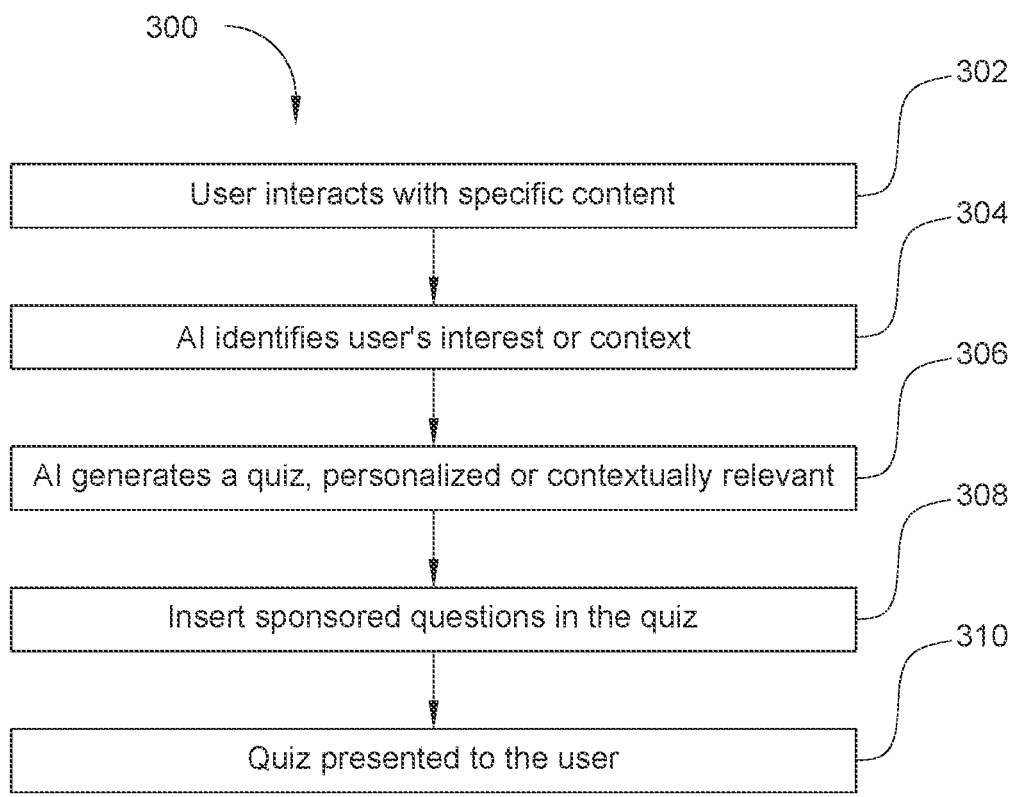
FIG. 3 illustrates a flowchart showing a method to generate a quiz.

FIG. 3 illustrates a flowchart explaining process flow 300 executed by the advertisement server 114 for creating the quiz. At 302, the user of the client device 112 interact with a specific content accessible through websites or web applications 113. The content may include articles, videos, games, or any other engaging material according to the user's preferences and interests. At 304, the AI algorithms within the Advertisement Server 114 start processing the data. The AI algorithms aims to understand the user's behaviour, interactions, and preferences to identify their interests or determine the context of the content provided to the client device. At 306, based on the results of the AI analysis, the Advertisement Server proceeds to generate an interactive quiz. The quiz is align with the user's identified interests or contextually relevant to the ongoing content provided to the client device, ensuring an engaging and immersive quiz encounter. At 308, the Advertisement Server 114 insert sponsored questions into the generated quiz. The advertisers 116 can provide sponsored questions or AI algorithms within the Advertisement Server 114 can generate sponsored questions that harmonize with the user's interests or the theme of the specific content, offering targeted advertising opportunities that do not disrupt the user experience. At 310, quiz generate by the Advertisement Server 114 is presented to the client device 112 along with the specific content.

The quiz generation process is empowered by AI algorithms, ensuring a versatile and personalized quiz experience. The inventive system employs AI-driven techniques that can generate the same quiz for a specific content, ensuring consistency and standardization across multiple users interacting with the same content. However, the AI algorithms are not limited to this approach, as they possess the intelligence to adapt and personalize quiz questions based on individual users' preferences, interests, and previous interactions. By tailoring quizzes to users' unique profiles, the system optimizes user engagement, creating a more enjoyable and relevant experience. This dynamic quiz generation capability represents a breakthrough in interactive advertising, allowing for both standardized quizzes and personalized content interactions based on users' individual preferences and behaviours.

Figure 4:
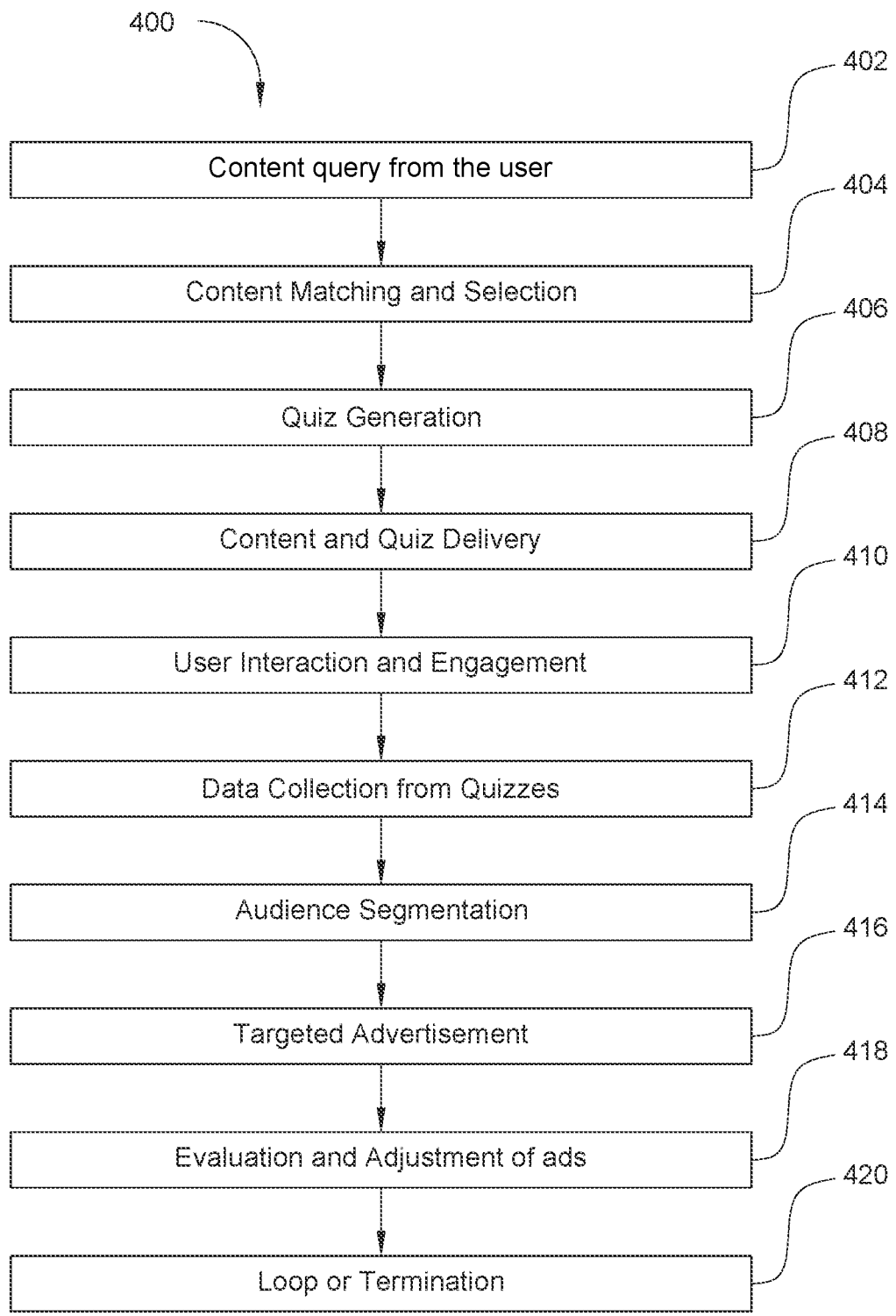
FIG. 4 illustrates a flowchart showing one example embodiment of the interaction between the client device, content provider server and advertisement server.

FIG. 4 illustrates a flowchart showing one example embodiment of interaction between the client device 112, content provider server 118 and advertisement server 114. Step 402 include content query from the user. In step 402, the interaction begins when a user submits a search query on their client device 112, seeking specific content. The content may include articles, videos, games, or any other engaging material customized to match individual user preferences and interests. The Content Provider Server 118 receives the user's query and starts the content retrieval process.

Step 404 include Content Matching and Selection. In step 404, the Content Provider Server 118 searches its database using suitable algorithms to find content that matches the user's query. It identifies relevant articles, videos, or other media that closely align with the user's interests and preferences. After locating and selecting the relevant content, the Content Provider Server 118 initiates a request to the Advertisement Server 114 to generate a quiz. This request may include information about the user, content's topic, keywords, or category.

Step 406 include Quiz Generation. In step 406, upon receiving the request from the Content Provider Server 118, AI algorithms within the Advertisement Server 115 are activated to generate interactive quiz. The generated quiz include questions related to the content requested by the user and include some sponsored questions. Sponsored questions (questions provided by the advertisers) are selected from the database of the advertisement server 114. In addition to sponsored questions advertisement server 115 can attach an advertisement with the quiz questions as shown in the FIG. 2c. The advantage of generating interactive quizzes is that it enhances user engagement and increase ad exposure.

Step 408 include content and quiz delivery. In step 408, the Advertisement Server 114 sends the generated quiz back to the Content Provider Server 118. The Content Provider Server 118 combines the quiz with the relevant content and prepares a package for delivery to the user's client device 112.

Step 410 include user interaction and engagement. In step 410, user of the client device 112 receives the content and the associated quiz from the Content Provider Server 118.

The user interacts with the quiz, answering both the content-related questions and the sponsored questions.

Step 412 include data collection from quizzes. In step 412, user responses to both content-related and sponsored questions are collected by the Content Provider Server 118. It may share relevant data with the Advertisement Server 114, providing insights into user engagement, quiz completion rates, and other metrics that can help advertisers measure the effectiveness of their campaigns. The advertisement server 114 collects user responses and engagement data from the content provider server 118 and store that data in its database. This data is valuable for understanding user preferences, knowledge levels, and interactions, providing insights into the effectiveness of the presented content and user engagement.

Step 414 include audience segmentation. In step 414, the advertisement server 114 utilize the collected quiz data and performs audience segmentation based on it. AI-driven analysis in the Advertisement Server 114 categorizes users into specific groups based on their responses and behaviour. This segmentation enables the platform to create distinct user profiles and identify relevant advertising targets.

Step 416 include targeted advertisement. In step 416, the advertisement server 114 employs targeted advertising strategies based on the audience segmentation. The advertisers can use the data to present customized advertisements to specific user segments, ensuring content relevancy and maximizing advertising impact.

Step 418 include evaluation and adjustment of ads. In step 418, the advertisement server 114 continuously evaluates the effectiveness of the targeted ads and makes necessary adjustments to advertising strategies for optimal results.

Step 420 include loop or termination. In step 420, the interaction process may continue in a loop, allowing for multiple rounds of content delivery and quiz generation based on user engagement. Alternatively, the interaction terminates after a single quiz session.

Figure 5:
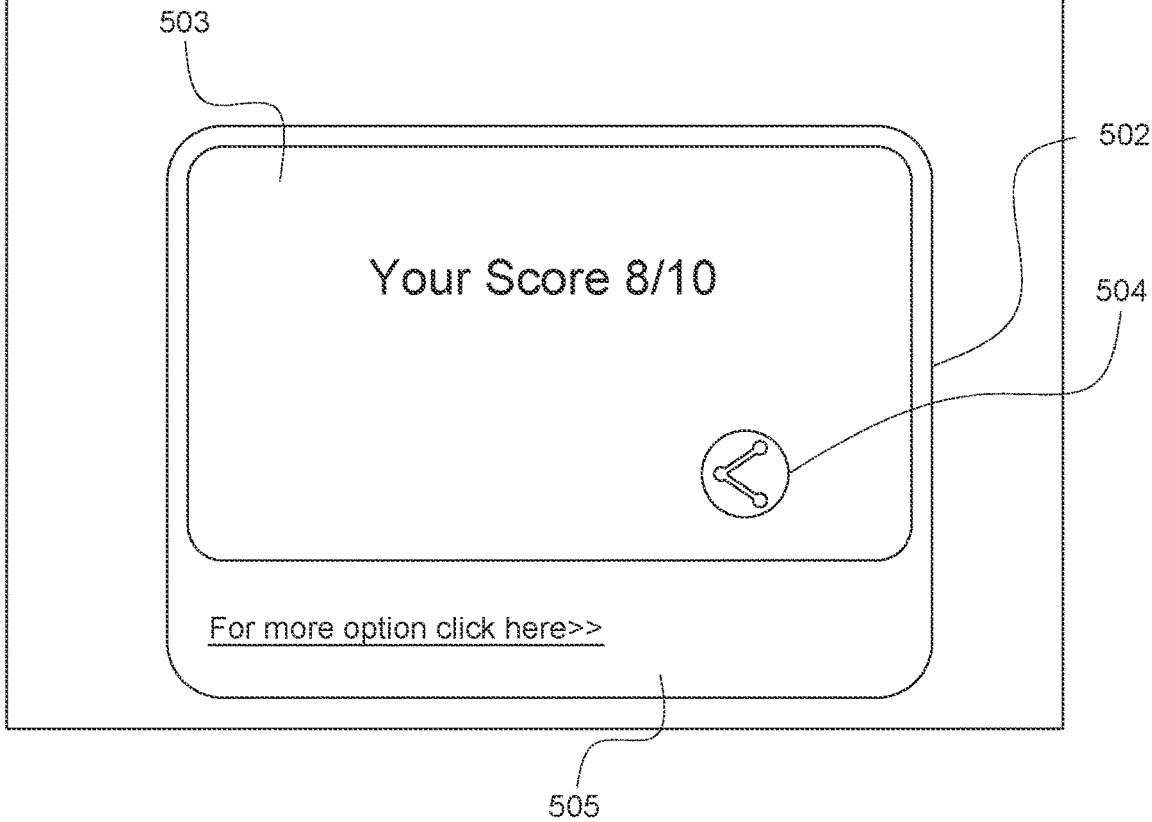
FIG. 5 illustrates a visual representation of a web page that is presented to the user at the end of the quiz.

In an embodiment, when user of the client device 114 answer all of the questions and reach at the end, then final score is displayed to the user. FIG. 5 shows a visual representation of a web page 500 that is presented to the user at the end of the quiz. The web page 500 include the content 501 that is specifically demanded by the user, and it also incorporates an interactive quiz section 502. The interactive quiz section 502 include the final score 503, a share button 504, and a more option button 505. The final scope 503 depends on the number of questions correctly answered by the user. The share button 504 is used to share the final score to various social media platforms. The more option button 505 is used to open the more options that are related to score of the user or various other information that can be provided by the Advertisement Server 114. The other information that can be provided by the system 100 are explain with respect to FIG. 6.

Figure 6:
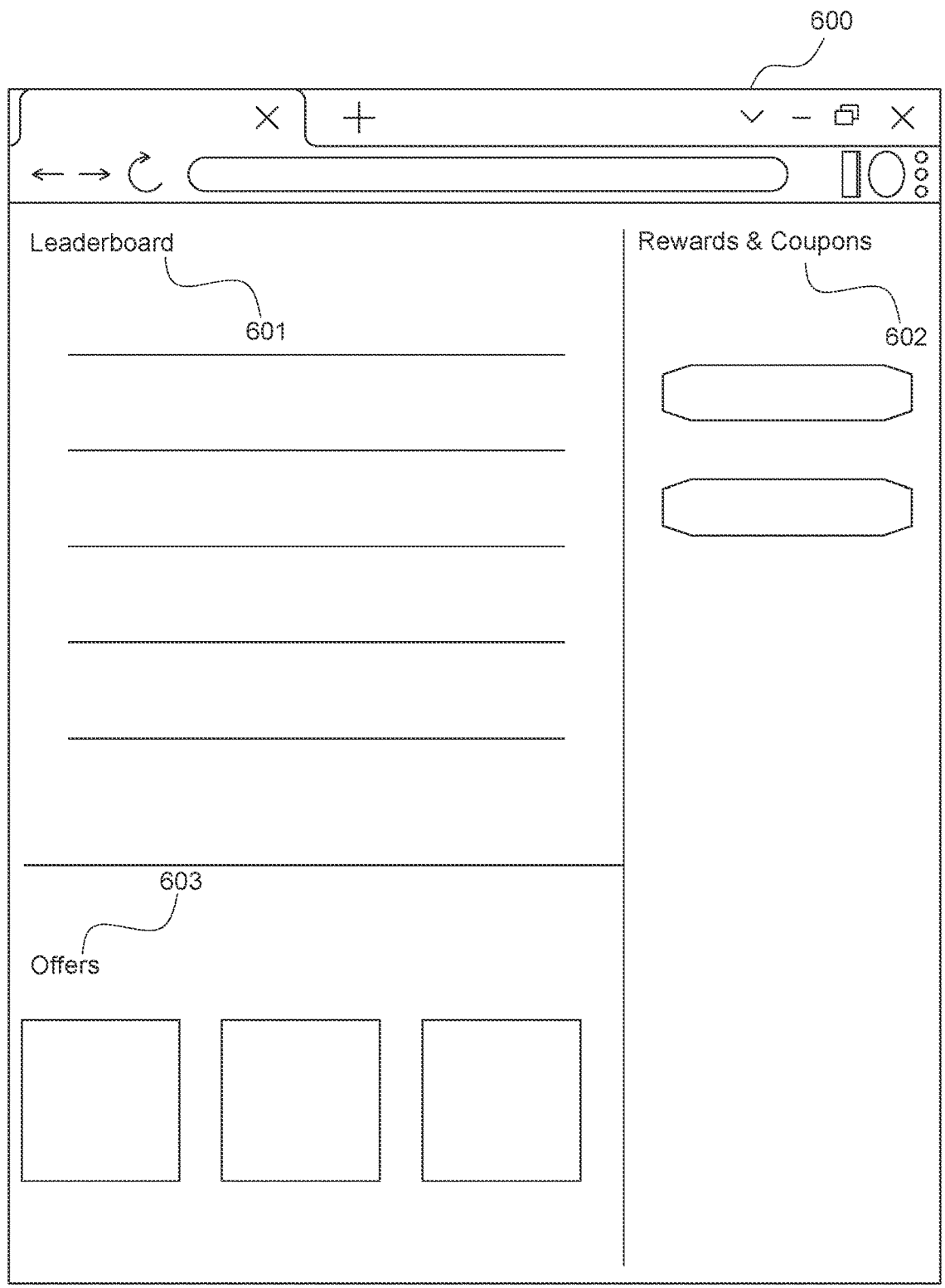
FIG. 6 illustrates a visual representation of a web page when the user clicks on more options button in the quiz section.

FIG. 6 represent a web page 600 presented to the user when user of the client device 114 click on the more option button of FIG. 5. The web page 600 include various sections such as leaderboard 601, Rewards and Coupons 602, Offers 603, and may include other sections. The leaderboard 601 may include the various information regarding the performance and previous records of a user in the quiz. The leaderboard 601 may include previous quiz results, progress and leveling information of a user, point system based on the correctly answered questions, awarded badges based on the performance and number of quiz attempted, all included to enhance the user experience and increase the interaction of the user with the system. The Rewards and Coupons section 602 may include exclusive coupons or promotional codes that can be redeemed for discounts, freebies, or special offers from the advertising brands. The system 100 offers users the opportunity to earn rewards and coupons by providing correct answers to quizzes. The offers section 603 may include a direct link to products or services that users have previously shown interest in while participating in the quiz, specifically by providing answers to sponsored questions. Here, environment 600 is explained through a separate web page for exemplary purpose only. The environment 600 may be implemented using pop-ups, embedded within the content, or as standalone elements on a separate page.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A computer-implemented method for targeting advertisements by an advertisement server, comprising:

receiving, from a user device, first content presented via a browser application at the user device, the first content including one or more of graphics, text, video, or multimedia, and the first content being generated in accordance with one or more web based languages or protocols including one or more of an employ handheld device markup language (HDML), a wireless markup language (WML), WMLScript, JavaScript, a standard generalized markup language (SMGL), a hypertext markup language (HTML), or an extensible markup language (XML);

determining, via a machine learning module integrated with the advertisement server, context of the first content;

generating, via the machine learning model, a set of contextual quiz questions based on the context of the first content;

selecting a subset of contextual quiz questions from the set of contextual quiz questions, one or more contextual quiz questions of the subset of contextual quiz questions including contextual quiz questions regarding the first content;

selecting one or more third-party questions from a group of third-party questions based on the context of the first content, each third-party question of the group of third-party questions being provided to the advertisement server by a third-party of one or more third-parties unaffiliated with a party that generated the first content;

generating an interactive quiz including the one or more third-party questions and the subset of contextual quiz questions, the interactive quiz being generated in the one or more web based languages or protocols for presentation to the user via the browser application;

transmitting, to the user device, the interactive quiz, such that the interactive quiz is displayed at the browser application of the user device with the first content;

generating a user profile in accordance with receiving a respective response to each contextual question of the subset of contextual quiz questions and each third-party question of the one or more third-party questions;

receiving, from the user device, second content displayed at the browser application, the second content being displayed after the first content;

selecting, in accordance with receiving the second content, advertisement content based on the user profile, such that the advertisement content is targeted to the user; and transmitting, to the user device, the advertisement content, such that the advertisement content is displayed at the browser application with the second content.

2. The computer-implemented method of claim 1, wherein the interactive quiz section comprises a section for answering one or more questions and a next button allowing the user to proceed to a next question.

3. The computer-implemented method of claim 1, wherein the one or more third-party questions include at least one market survey question.

4. The computer-implemented method of claim 1, wherein the one or more third-party questions are customized to align with an advertiser's brand image.

5. The computer-implemented method of claim 1, wherein the one or more third-party questions include at least one advertisement question.

6. An apparatus for targeting advertisements at an advertisement server, comprising:

one or more processors; and one or more memories coupled with the one or more processors and storing processor-executable code that, when executed by the one or more processors, is configured to cause the advertisement server to:

receive from a user device first content presented via a browser application at the user device, the first content including one or more of graphics, text, video, or multimedia, and the first content being generated in accordance with one or more web based languages or protocols including one or more of an employ handheld device markup language (HDML), a wireless markup language (WML), WMLScript, JavaScript, a standard generalized markup language (SMGL), a hypertext markup language (HTML), or an extensible markup language (XML);

determine via a machine learning module integrated with the advertisement server, context of the first content;

generate via the machine learning model, a set of contextual quiz questions based on the context of the first content;

select a subset of contextual quiz questions from the set of contextual quiz questions, one or more contextual quiz questions of the subset of contextual quiz questions including contextual quiz questions regarding the first content;

select one or more third-party questions from a group of third-party questions based on the context of the first content, each third-party question of the group of third-party questions being provided to the advertisement server by a third-party of one or more third-parties unaffiliated with a party that generated the first content;

generate an interactive quiz including the one or more third-party questions and the subset of contextual quiz questions, the interactive quiz being generated in the one or more web based languages or protocols for presentation to the user via the browser application;

transmit, to the user device, the interactive quiz, such that the interactive quiz is displayed at the browser application of the user device with the first content;

generate a user profile in accordance with receiving a respective response to each contextual question of the subset of contextual quiz questions and each third-party question of the one or more third-party questions;

receive, from the user device, second content displayed at the browser application, the second content being displayed after the first content;

select, in accordance with receiving the second content, advertisement content based on the user profile, such that the advertisement content is targeted to the user; and transmit, to the user device, the advertisement content, such that the advertisement content is displayed at the browser application with the second content.

7. The apparatus of claim 6, wherein the interactive quiz section comprises a section for answering one or more questions, and a next button allowing the user to proceed to a next question.

8. The apparatus of claim 6, wherein the one or more third-party questions include at least one market survey question.

9. The apparatus of claim 6, wherein the one or more third-party questions are customized to align with an advertiser's brand image.

10. The apparatus of claim 6, wherein the one or more third-party questions include at least one advertisement question.

* * * * *